United States Patent [19]

Issard

[11] 4,095,416

[45] Jun. 20, 1978

[54] SHACKLING DEVICE

[75] Inventor: Gerard Issard, Thiers, France

[73] Assignee: Societe Wichard, Thiers, France

[21] Appl. No.: 698,776

[22] Filed: Jun. 22, 1976

[30] Foreign Application Priority Data

Jul. 8, 1975 France .................. 75 22024

[51] Int. Cl.² .......................................... F16G 15/04
[52] U.S. Cl. .................................................... 59/86
[58] Field of Search .............................. 59/86, 93, 85

[56] References Cited

U.S. PATENT DOCUMENTS

| 1,183,117 | 5/1916 | Clevis ............................... 59/86 |
| 1,197,008 | 9/1916 | Burke ............................... 59/86 |
| 2,010,853 | 8/1935 | Dyer ................................. 59/86 |
| 2,209,007 | 7/1940 | Stevenson ........................ 59/86 |
| 2,259,217 | 10/1941 | Stevenson ........................ 59/86 |
| 2,435,336 | 2/1948 | Belvel .............................. 59/86 |

FOREIGN PATENT DOCUMENTS 10,117 of 1899 United Kingdom .................. 59/86

*Primary Examiner*—C.W. Lanham
*Assistant Examiner*—Gene P. Crosby
*Attorney, Agent, or Firm*—Browdy and Neimark

[57] ABSTRACT

A shackling device includes a U-shaped member and a pin. The ends of the U-shaped member are provided respectively with a threaded aperture and an unthreaded aperture. One end of the pin is provided with threads which are to be mated with the threads within the threaded aperture. The unthreaded aperture has a diameter which is larger than that of the portion of the pin which is not provided with threads. At least a portion of the unthreaded aperture is of smaller diameter than the diameter of the threaded portion of the pin. An eye is provided on that end of the pin which is not provided with threads.

1 Claim, 8 Drawing Figures

SHACKLING DEVICE

BACKGROUND OF THE INVENTION

This invention relates to a shackling device having a threaded pin and a U-shaped member. More particularly the invention concerns a shackling device having a pin and U-shaped member which cannot become detached from one another.

Shackling devices are used to connect two parts which terminate in rings or the like. For this purpose, shackling devices are arranged so that the two pieces to be joined can be assembled or disassembled at will. Such devices have a great many areas of application, one of the most important being the anchoring of ships.

A traditional shackling device is composed of a U-shaped (stirrup-like) member whose ends are provided respectively with a smooth aperture and an aperture having internal threads, these apertures being coaxial and by a pin which is provided with an elongated smooth portion at one end, extended in the form of an eye, and at the other end by a threaded portion having a diameter corresponding to that of the threaded aperture in the U-shaped member. In order to close the shackling device, it is sufficient to run legs of the U-shaped member through the two rings or the like to be joined and then to close the U-shaped member by the pin, the latter being held in place by screwing. In order to separate the two parts, it is suffice to proceed in reverse order, in other words, to unscrew the pin from the U-shaped member in order to open the shackling device.

The principal disadvantage of traditional shackling devices is that the whole pin, including the threaded portion, can pass through the unthreaded aperture in the U-shaped member. Consequently, it often happens that after the pin has been unscrewed, it suddenly falls out of the U-shaped member if the user is not careful. Obviously, when the pin falls out of the U-shaped member, it can be lost, and the user is left with only the U-shaped member, which is useless by itself as a shackling device. Likewise, there are shackling devices in which the diameter of the threaded portion of the pin is greater than the diameter of the smooth portion thereof. In this case, the two ends of the U-shaped member are provided with identical threaded apertures which can cooperate with two shaped apart threaded portions of the pin. Consequently, when the shackling device is in the closed position, after it has been initially unscrewed, the pin remains connected to the U-shaped member; it is only after being unscrewed further that the pin and U-shaped member can be separated from one another.

A solution of this kind has the disadvantage of being expensive to manufacture, because threaded apertures have to be provided in both ends of the U-shaped member. Moreover, it is unsatisfactory in practice since, after the initial unscrewing has been accomplished, the pin partially blocks the opening of the U-shaped member, thus causing problems in handling it.

SUMMARY OF THE INVENTION

It is an object of the present invention to provide a shackling device having a pin which cannot be completely disconnected from its associated U-shaped member.

It is another object of the present invention to provide a shackling device which has a pin having only a single threaded portion effectively associated with a U-shaped member with a single threaded aperture.

It is an additional object of the present invention to provide a shackling device which assures that its pin and associated U-shaped member cannot become detached and yet not have the pin block the opening in the U-shaped member.

The foregoing objects, as well as others which are to become clear from the text below, are achieved by providing a shackling device in which the diameter of a threaded portion of its pin is greater than the diameter of the smooth portion of the pin, and a smooth aperture of its U-shaped member has a diameter greater than the diameter of the smooth portion of the pin, the smooth aperture in the U-shaped member being provided with at least one portion which has a diameter smaller than the diameter of the threaded portion of the pin.

Consequently, in the open position the threaded portion of the pin butts up against the narrow part of the smooth unthreaded aperture in the U-shaped member and the pin cannot escape from the latter. An arrangement of this kind is also desirable because the large diameter of the threaded portion of the pin increases the resistance of the shackle to pulling.

Advantageously, the diameter of the unthreaded, smooth aperture is greater than the diameter of the threads on the pin, with the smooth aperture being constricted in the proximity of the latter. This constriction being located toward the outside of the U-shaped member. This arrangement is interesting because the threaded part of the pin, when the shackle is in the open position, can penetrate all the way into the smooth hole of the member, but without being able to escape from the latter, thus leaving a large opening between the two sides of the member.

In a preferred embodiment, the constricted portion of the unthreaded aperture is formed by a shoulder, produced by upsetting the material of the U-shaped member using a press or punch. When carried out on the outside surface of the U-shaped member, the pressing or punching forms the shoulder in question on at least one part of the periphery of the unthreaded aperture in the U-shaped member after the pin has been installed.

The force of the blow from the punch or press is such that in no case will it immobilize the pin in the unthreaded aperture. The pin must remain free in order to be able to be screwed and unscrewed at will.

In one embodiment of the shackling device according to the present invention, the constricted portion of the unthreaded aperture is formed by a shoulder, which is provided on the outside of the aperture and on the outside of the U-shaped member, the shoulder having been produced by machining the unthreaded aperture with the pin held in place, after being installed in the threaded aperture. The eye is punched after the pin has been installed.

While this second embodiment is interesting from the theoretical standpoint, it has the disadvantage of being more expensive than the preceding one. In the case of these two embodiments, it is interesting that the shoulder which the unthreaded aperture presents is provided on a portion of the periphery of the latter, next to the body of the U-shaped member. Advantageously, the punch can be applied at an angle on the order of 160° (80° to either side of the axis of the shackling device).

In this manner, with the pull acting on the pin toward the free end of the member, the area of contact between the pin and the member is maximum since it is in contact for the entire length of the hole.

Advantageously, the pin is provided, in one varient, between its smooth part and its threaded part, with a smooth area having a diameter corresponding to that of the threaded portion of the pin, with a corresponding bore being provided adjacent to the threaded aperture.

In this manner, any possible contact between the threaded portion of the pin and the shoulder of the unthreaded aperture is avoided.

According to a further embodiment of the shackling device of the present invention, the diameter of the unthreaded aperture of the U-shaped member is smaller than the diameter of the thread on the pin, the latter being engaged by the threaded aperture, and the eye being punched after the pin has been installed.

This further embodiment has the slight inconvenience, relative to the aforementioned ones, of being less practical because in the open position the threaded portions of the pin partially blocks the opening between the two legs of the U-shaped member.

In the case where the shoulder of the unthreaded aperture of the U-shaped member is made by stamping or punching, it is desirable to provide, after the forming operation, several indentations or notches regularly distributed around the periphery of the unthreaded aperture, the dimensions of the U-shaped member and the pin being chosen so that in the threaded position of the latter, the ends of projections on the eye, located at the end of the pin, engage the two indentations or notches which are diametrically opposite one another, thus preventing any accidental unscrewing of the pin.

DETAILED DESCRIPTION OF THE PREFERRED EMBODIMENTS

Figure 1:
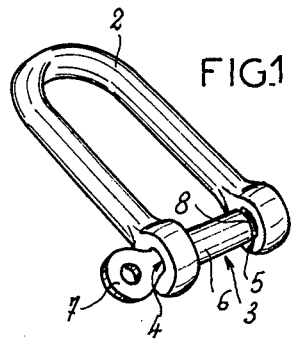
FIG. 1 is a pictorial view of a shackling device in the closed position.
Figure 5:
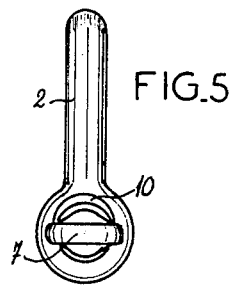
FIGS. 4 and 5 are respectively side and end views, partially in cross-section, showing the shackling device made of the parts shown in FIGS. 2 and 3 in the closed position.
Figure 2:
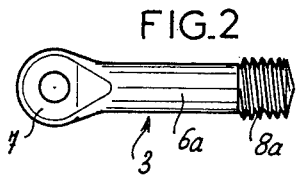
FIGS. 2 and 3 are respectively two side views, partially in cross-section, of a pin and of a U-shaped member of a shackling device according to the invention.
Figure 6:
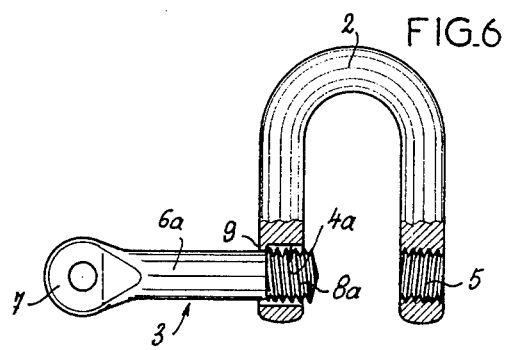
FIG. 6 is a side view, partially cut away, of the shackling device of FIGS. 4 and 5 in the open position.
Figure 3:
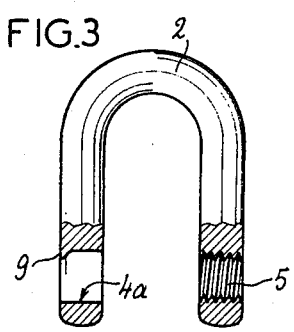

As shown in FIG. 1, a shackling device is composed of a U-shaped member 2 and a pin 3. The U-shaped member is provided respectively at its ends with a smooth, unthreaded aperture 4 and a threaded aperture 5, these apertures being coaxial. The pin 3 is provided with a smooth portion 6 terminating at one end in an eye 7 and at the other end with a threaded portion 8 having a diameter corresponding to that of the aperture 5.

The pin 3 of the shackling device is provided with a threaded portion 8a whose diameter is greater than that of its smooth portion 6a.

According to the present invention, as shown in FIGS. 2-6, an aperture 4a of a U-shaped member has a diameter greater than that of a smooth portion 6a of a pin 3, and is provided with a shoulder 9 on its inside surface, forming a passageway which is larger in diameter than the cross-section of the smooth portion 6a of the pin 3, but smaller than the cross-section of the threaded portion 8a thereof.

In the embodiment shown in FIGS. 2–6, an eye 7 is stamped out after the pin 3 has been provided. The pin 3 is installed while the smooth aperture 4a has a uniform opening. After installing the pin 3 a portion of the periphery of aperture 4a is deformed on the outside surface of the U-shaped member 2, more precisely, the edge of the aperture 4a is displaced toward the body of the U-shaped member 2. This operation, resulting in the production of a depression 10, (FIG. 5) causes the material to move toward the inside of the aperture 4a, causing a shoulder 9 to develop.

Figure 4:
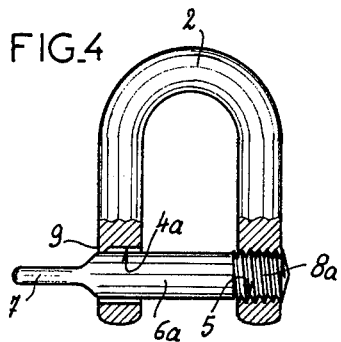

As shown in FIG. 4, the shackling device appears to be nearly identical to a traditional shackle when in the closed position. In the open position, threaded portion 8a is practically completely hidden inside unthreaded aperture 4a, and the end of threaded portion 8a, located beside the body of the pin 3, comes to rest against the shoulder 9 and thereby avoids any accidental separation of the U-shaped member 2 and the pin 3, without this constituting a problem in using the shackling device.

Figure 7:
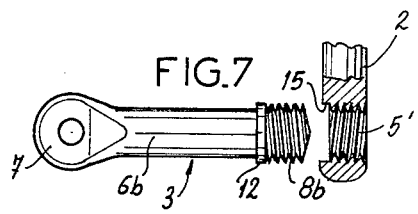
FIG. 7 is a side view of a sample embodiment of a pin which may be used in an embodiment of the invention with a portion of the U-shaped member being shown.

In an embodiment of the pin 3, shown in FIG. 7, between the threaded portion 8b and a smooth portion 6b, constituting the body of the pin 3, a distinct further smooth portion 12 is provided, this smooth portion 12 having a diameter corresponding to that of a threaded portion 18b. The latter prevents any contact between the threads of the threaded portion 8b and the shoulder 9, as well as preventing any separation of the pin 3 and the U-shaped member 2 by unscrewing of threaded portion 8b, as a result of coming into contact with the shoulder 9. The member 2, as shown in FIG. 7 has an aperture 5' which as a bore 15 of slightly larger diameter to receive the smooth portion 12 of the pin 3.

Figure 8:
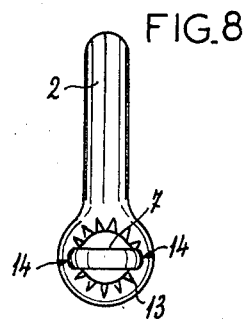
FIG. 8 is an end view of an embodiment of the present invention showing the pin of FIG. 7 with its eye in place in notches or indentations in its associated U-shaped member.

In an embodiment of the shackling device according to the present invention, as illustrated in FIG. 8, an outside surface of the U-shaped member 2 is provided during the stamping operation with a series of depressions or notches 13 disposed in regular fashion around the periphery of the unthreaded aperture. In this case, the dimensions of the U-shaped member 2 and the pin 3 are selected so that in the screwed-in position of the latter, the ends of projections 14 of the eye, located on an end of the pin 3, fit into two of the depressions or notches 13 located diametrically opposite one another, thus avoiding any accidental unscrewing of the pin 3 of the shackling device.

Of course, the invention is not limited to only those embodiments of shackling device which are described hereinabove solely for the same of examples; on the contrary, it includes numerous other embodiments and varients. Thus, it is particularly noteworthy that the shoulder with which the smooth aperture is provided can be produced by machining, which would be accomplished by a tool being brought up against the outside surface of the U-shaped member, or could consist of a washer mounted inside a depression on the outside surface of the U-shaped member. Other solutions, which would consist in filing down the end containing the unthreaded aperture, so as to make the latter oval and to allow the smooth portion of the pin, but not the threaded portion to pass through or to provide the smooth aperture with a diameter smaller than that of the threaded portion of the pin. It is also equally obvious that the use of the shackling device according to the present invention is independent of the nature of the materials of which it is made.

It will be obvious to those skilled in the art that various changes may be made without departing from the scope of the invention and the invention is not to be considered limited to what is described in the specification.

I claim:

1. A shackling device according to claim 1, wherein said pin is provided between its smooth portion of given diameter and its threaded portion with a further smooth portion whose diameter is larger than said given diameter and corresponds to that of said threaded portion of said pin, and a bore is provided beside said second aperture and in axial alignment therewith, the diameter of said bore corresponding to said diameter of said further smooth portion.